United States Patent [19]
Kawai et al.

[11] Patent Number: 5,974,358
[45] Date of Patent: Oct. 26, 1999

[54] NAVIGATION APPARATUS AND NAVIGATION PROCESS FOR WRITING REFERENCE LATITUDE AND LONGITUDE LINES ON GENERALLY AVAILABLE MAP INDICATING REDUCTION SCALE AND NORTH DIRECTION

[75] Inventors: Kozo Kawai; Kaname Okuno, both of Kadoma, Japan

[73] Assignee: Matsushita Electric Works, Ltd., Osaka, Japan

[21] Appl. No.: 08/881,797

[22] Filed: Jun. 24, 1997

[30] Foreign Application Priority Data

Jun. 26, 1996 [JP] Japan ................................. 8-166463

[51] Int. Cl.[6] ............................................. G06F 165/00
[52] U.S. Cl. .................... 701/213; 701/207; 701/208; 701/211; 701/212; 340/988; 340/990
[58] Field of Search ..................................... 701/200, 201, 701/206, 207, 208, 211, 212, 213, 214; 340/988, 990, 995; 73/178 R

[56] References Cited

U.S. PATENT DOCUMENTS

| | | | |
|---|---|---|---|
| 5,311,173 | 5/1994 | Komura et al. ......................... | 701/208 |
| 5,315,295 | 5/1994 | Fujii ........................................ | 340/988 |
| 5,353,034 | 10/1994 | Sato et al. ............................... | 701/208 |
| 5,617,319 | 4/1997 | Arakawa et al. ....................... | 701/207 |

FOREIGN PATENT DOCUMENTS

| | | |
|---|---|---|
| 0 572 129 A1 | 1/1993 | European Pat. Off. . |
| 2 298 539 | 4/1996 | European Pat. Off. . |
| 5-100619 | 4/1993 | Japan . |
| 6-138203 | 5/1994 | Japan . |

Primary Examiner—William A. Cuchlinski, Jr.
Assistant Examiner—Gertrude Arthur
Attorney, Agent, or Firm—Lynn & Lynn

[57] ABSTRACT

A navigation apparatus is provided for surveying a present spot of the apparatus carried by a vehicle or a user with such surveying unit as a global positioning system (GPS), displaying on a display unit a present spot mark by means of latitudinal and longitudinal lines X and Y of the surveyed spot, showing on a guide display unit positions to be in coincidence with the latitudinal and longitudinal lines according to the surveyed spot, and transferring with a writing guide unit the positions of the latitudinal and longitudinal lines shown on the guide display unit onto a map. Then, the user places the apparatus on the map, and the present spot can be optimumly recognized on the map by means of the present spot mark.

10 Claims, 13 Drawing Sheets

NAVIGATION APPARATUS AND NAVIGATION PROCESS FOR WRITING REFERENCE LATITUDE AND LONGITUDE LINES ON GENERALLY AVAILABLE MAP INDICATING REDUCTION SCALE AND NORTH DIRECTION

BACKGROUND OF THE INVENTION

This invention relates to a navigation apparatus which is capable of surveying and displaying the present position of apparatus carried by a vehicle or a user, by means of such surveying unit as a global positioning system (GPS) employed, in combination with generally available printed maps.

DESCRIPTION OF RELATED ART

As conventional navigation apparatus, there have been practically utilized arrangements in which a map information obtainable by digitizing respective points of roads of a map is stored in such memory medium as CD-ROM, IC card and the like, the present position is surveyed by means of such surveying device as GPS, and the position is displayed on a display device to which the map information of an area including the present position is read out, which arrangement is referred to as an electronic map.

As another arrangement which does not constitute the foregoing electronic map, on the other hand, there has been disclosed in Japanese Patent Laid-Open Publication No. 6-138203 an arrangement in which a large number of maps in which the map information is printed are stored, a required one of the maps is taken out, and the present position is displayed on the particular map.

In the case of the foregoing arrangement employing the map information, however, it is required to provide, in an event where the map information is stored in the CD-ROM, a CD-ROM driving unit and corresponding circuit for reading out stored data of the map information or, where the map information is stored in the IC card, and IC card driving unit and a connector.

In this case, there has been a problem that the storage of a huge number of the map information in such memory medium as the CD-ROM or IC card has required much costs and many hours. Particularly in the event where the IC card is employed, the IC card has to be of a large memory capacity, so as to elevate the costs. Further, the CD-ROM driving unit required when CD-ROM is used has been expensive enough for rendering the apparatus unable to be inexpensive but readily able to be enlarged in dimensions.

In the known event of employing the map, there has been a problem that the dimension of the apparatus cannot be made smaller than at least the map so that, when a large map is used for easier visibility, the apparatus has to be enlarged, whereas an intention to minimize the apparatus should entail in the minimization in size of the map, the visibility of which is thereby made to be low. An example of such apparatus has been described in, for example, Japanese Patent Laid-Open Publication No. 5-100619.

In the known apparatus of this Publication No. 5-100619, the arrangement is so made that the present position can be displayed with a two dimensional operation of a cursor, and that the present position is presented by means of many rectangular zones provided to the map and the two dimensional cursor display brought into conformity with corresponding one of the rectangular zones. In this case, there arises a problem that a display means is required to have an outline made to coincide with the reduced scale of the rectangular zone of the map, so as to be toublesome, and the reduced scale has to be constant, so as to render the general use of the apparatus to be low.

In view of the foregoing respects, the present inventors have suggested, as an earlier invention disclosed in U.S. patent application No. 08/621,140 (corresponding Japanese Patent Laid-Open Publication No. 8-271278), a navigation apparatus which does not require any expensive memory madium nor any driving device causing the apparatus to be enlarged, but is capable of readily displaying the present position on any generally available printed maps without causing the apparatus to be enlarged in size.

According to the earlier invention, the apparatus incorporating a GPS receiver and a display means using a light transmissive liquid crystal board is arranged to have the display means made to function also as a guiding display with the particular board, so that, once a result of survey is obtained with the GPS receiver actuated, respective intervals between adjacent ones of the latitudinal and longitudinal lines according to the reduction scale of the printed map utilized are obtained by references to a table containing respective values of the intervals between the latitudinal and longitudinal lines for various scales of reduction of the maps, a pair of latitudinal and longitudinal lines X and Y which are closest at least to the result of survey are obtained through a computation in accordance with the obtained intervals, these latitudinal and longitudinal lines X and Y as well as their values are displayed on the display means acting also as the guiding display, and the present position is displayed by means of a present position mark.

However, while in the earlier invention a variety of the printed maps can be utilized, it is indispensable that the map utilized includes the latitudinal and longitudinal lines, and there has been left a problem that the apparatus is not open to any type of the maps but allows only limited type of maps to be utilizable.

SUMMARY OF THE INVENTION

Accordingly, the present invention has been suggested to eliminate the foregoing problems, and its object is to provide a navigation apparatus capable of employing even a map in which the latitudinal and longitudinal lines are not written.

According to the present invention, the above object can be realized by means of a navigation apparatus comprising means for surveying the latitude and longitude of a present spot, a transmissive display means placeable on a map utilized for displaying the result of survey in a manner capable of specifying positions of the latitudinal and longitudinal lines, a guiding display means for displaying the positions and their values of the latitudinal and longitudinal lines displayed and to be brought into coincidence with the latitudinal and longitudinal lines on the map, means for controlling the latitudinal line position and longitudinal line position displayed on the guiding display means in accordance with the latitude and longitude of the present spot surveyed, means for representing the present spot on the map by means of a present spot mark, and a writing guide means disposed adjacent to the transmissive display means for transferring the positions of the latitudinal and longitudinal lines displayed by the guiding display means onto the map.

Other objects and advantages of the present invention shall be made clear in the following description of the invention detailed with reference to respective embodiments of the invention shown in accompanying drawings.

Figure 1:
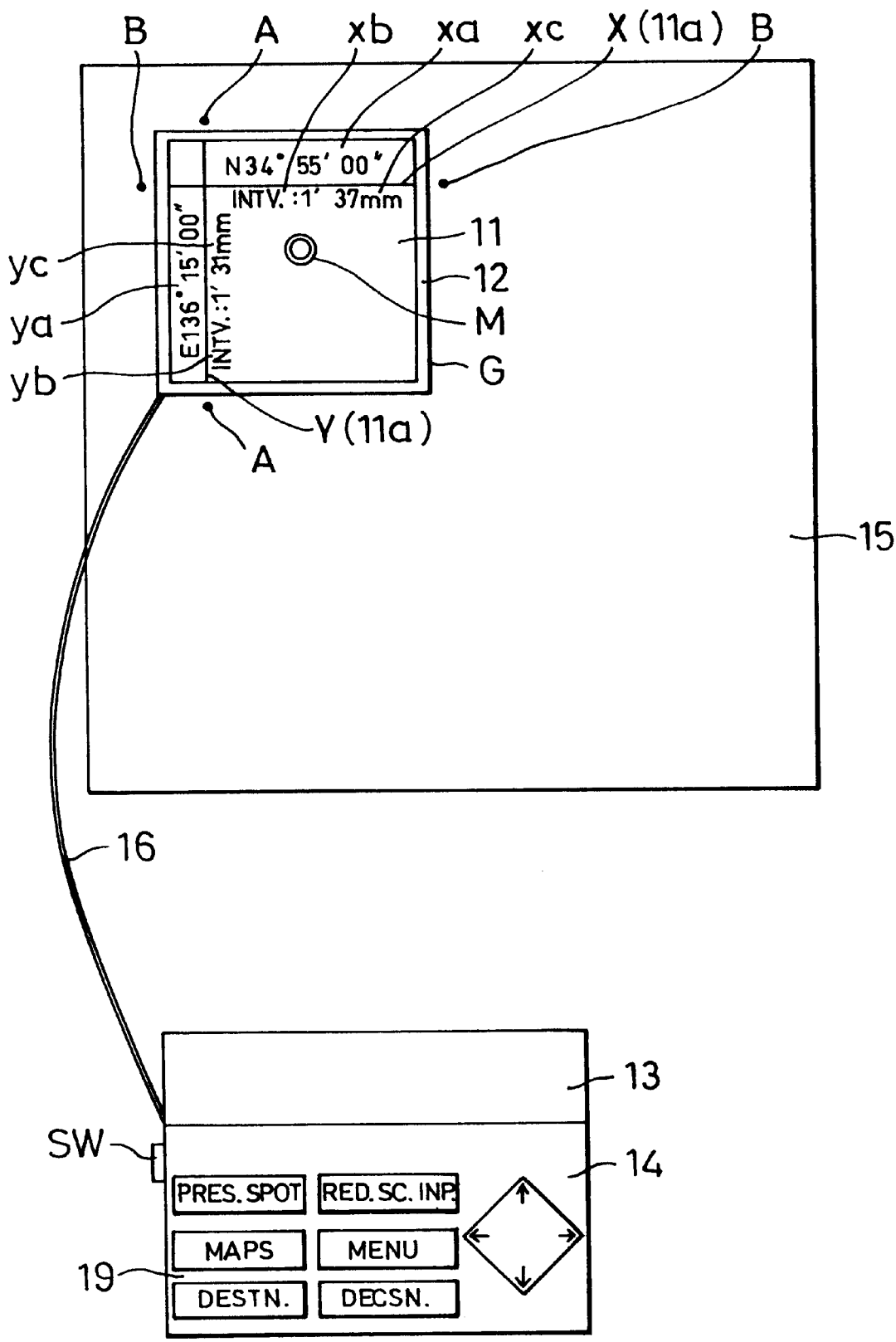
FIG. 1 shows in a plan view an embodiment of the navigation apparatus according to the present invention.

While the present invention shall now be described with reference to the embodiments shown in the drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 2:
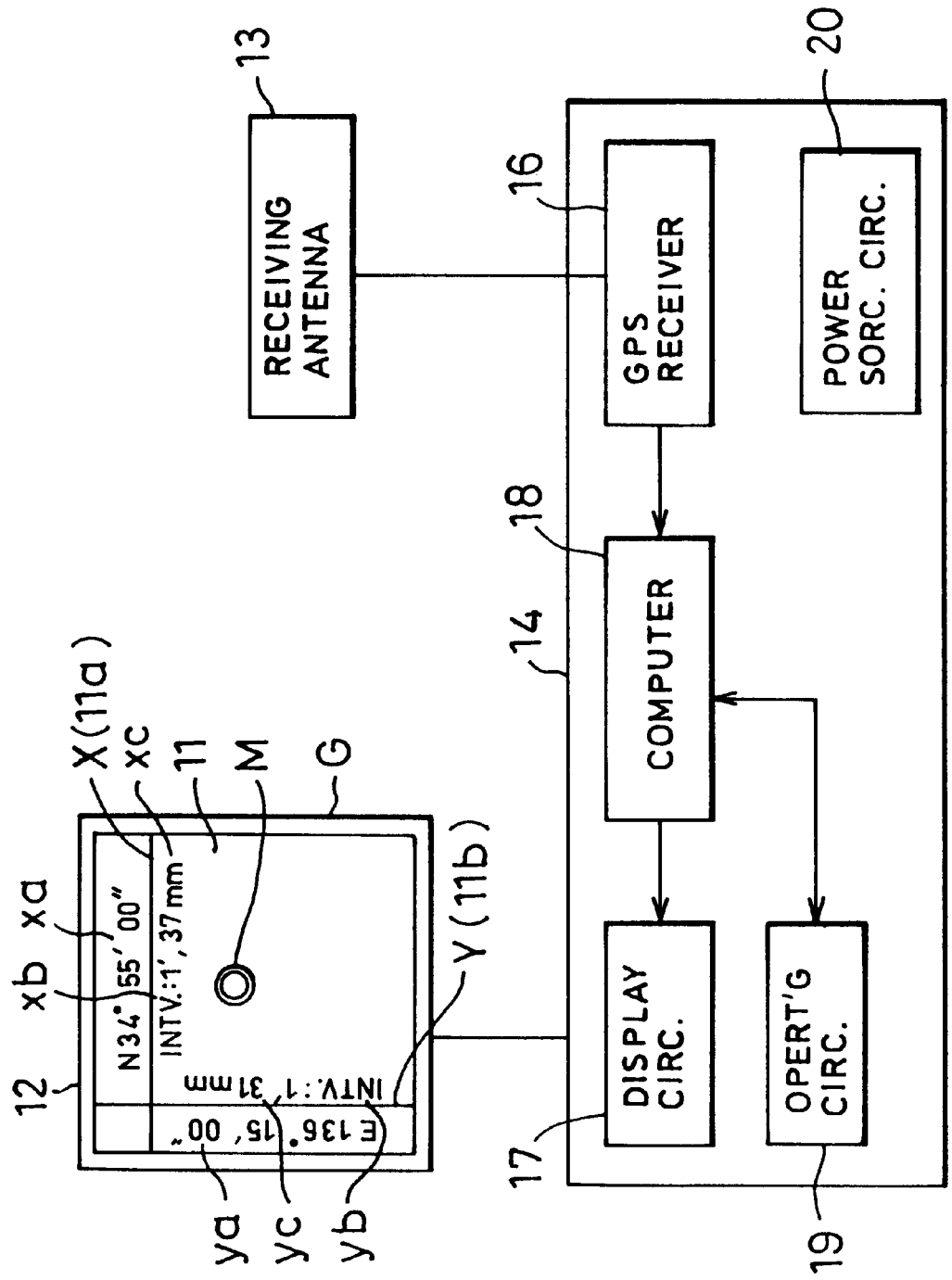
FIG. 2 is a block diagram of the embodiment of FIG. 1.
Figure 3:
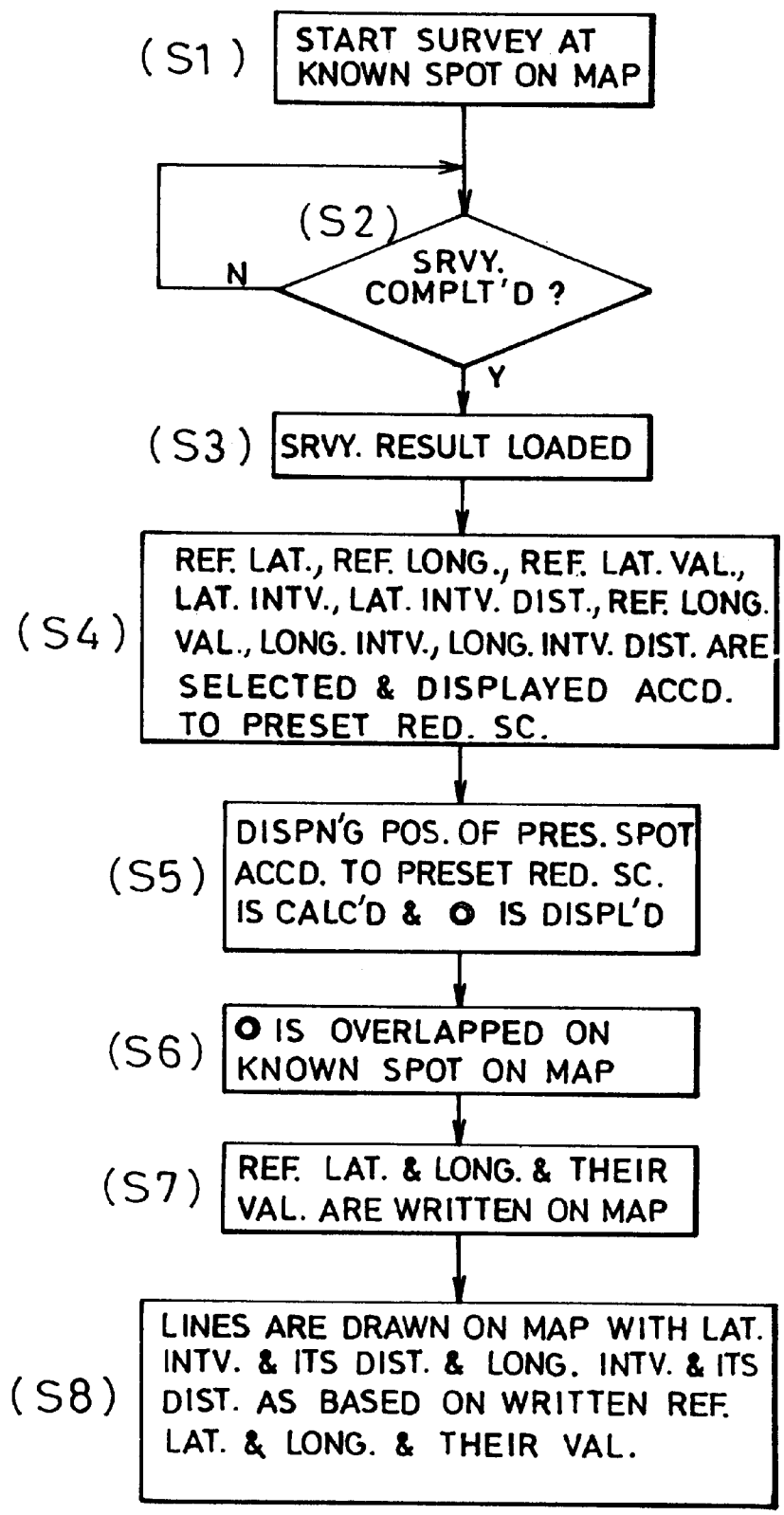
FIG. 3 is a flow chart of steps for writing the latitudinal and longitudinal line positions on the map in the embodiment of FIG. 1.

An embodiment of the navigation apparatus according to the present invention is shown in FIGS. 1–5, in which the apparatus generally comprises a display unit 12 and a main unit 14, which are mutually connected through a cable 6. The display unit 12 is constituted by a display means 11 formed with a light transmissive liquid crystal board and functioning also as a guiding display means, whereas the main unit 14 is provided with a GPS receiving antenna 13, and is constituted as shown in FIG. 2 by a GPS receiver 16, display circuit 17, operating circuit section 19, power source circuit 20, and computer 18 as a control means.

More specifically, with this arrangement, a reduction scale of a map 15 utilized in combination is input with the operating circuit section 19 actuated by the user, and the GPS survey of the present spot is executed, upon which, similarly to the case of, for example, U.S. patent application No. 08/621,140, the latitudinal line intervals and longitudinal line intervals in correspondence to the reduction scale of the map 15 are obtained, and a reference latitudinal line X as well as a reference longitudinal line Y which are close to a result of the survey are obtained in accordance with the obtained intervals, through calculations. These reference latitudinal and longitudinal lines X and Y are displayed on the display means 11 functioning also as the guiding display means, in a manner of which portions of a window of the display means 11 of transmissive liquid crystal board the reference latitudinal and longitudinal lines X and Y are passing, together with numerical values of these lines X and Y, and the present spot is indicated by a present spot mark M. In this case, the present navigation apparatus is arranged for simultaneous display of interval values xb and yb respectively of the latitudinal and longitudinal lines obtained from the known table of the intervals according to the reduction scale, as well as interval distances xc and yc denoting actual extent on the map 15 of the interval values xb and yb. Values of these interval distances xc and yc are operationally obtained in accordance with the reduction scale of the map. When the reduction scale of the map 15 is 1/50,000, for example, the interval distance xc of 1' of the latitudinal lines is 37 mm on the map 15, and the interval distance yc of 1' of the lngitudinal lines nearby a north latitude 35° is 31 mm on the map 15.

In an event where a map in which the latitudinal and longitudinal lines are not written, the GPS survey is executed at a spot known as the present spot on the map 15, so that the latitudinal and longitudinal lines X and Y, their values xa and ya, their interval values xb and yb, and interval distances xc and yc will be displayed on the display means 11. Then, the display unit 12 is placed on the map 15 with the present spot mark M placed to coincide with the present spot known on the map 15, and with the north direction of the display unit 12 also placed to coincide with the N direction of the map 15, then, in this state, the user transfers onto the map 15 positions of intersecting points B and B between extended lines of the reference latitudinal line X displayed on the display means 11 as seen in FIG. 1 and both side outer peripheral lines of a frame of the display means 11, and also positions of intersecting points A and A between extended lines of the reference longitudinal line Y displayed with the top and bottom peripheral lines of the frame.

Figure 4:
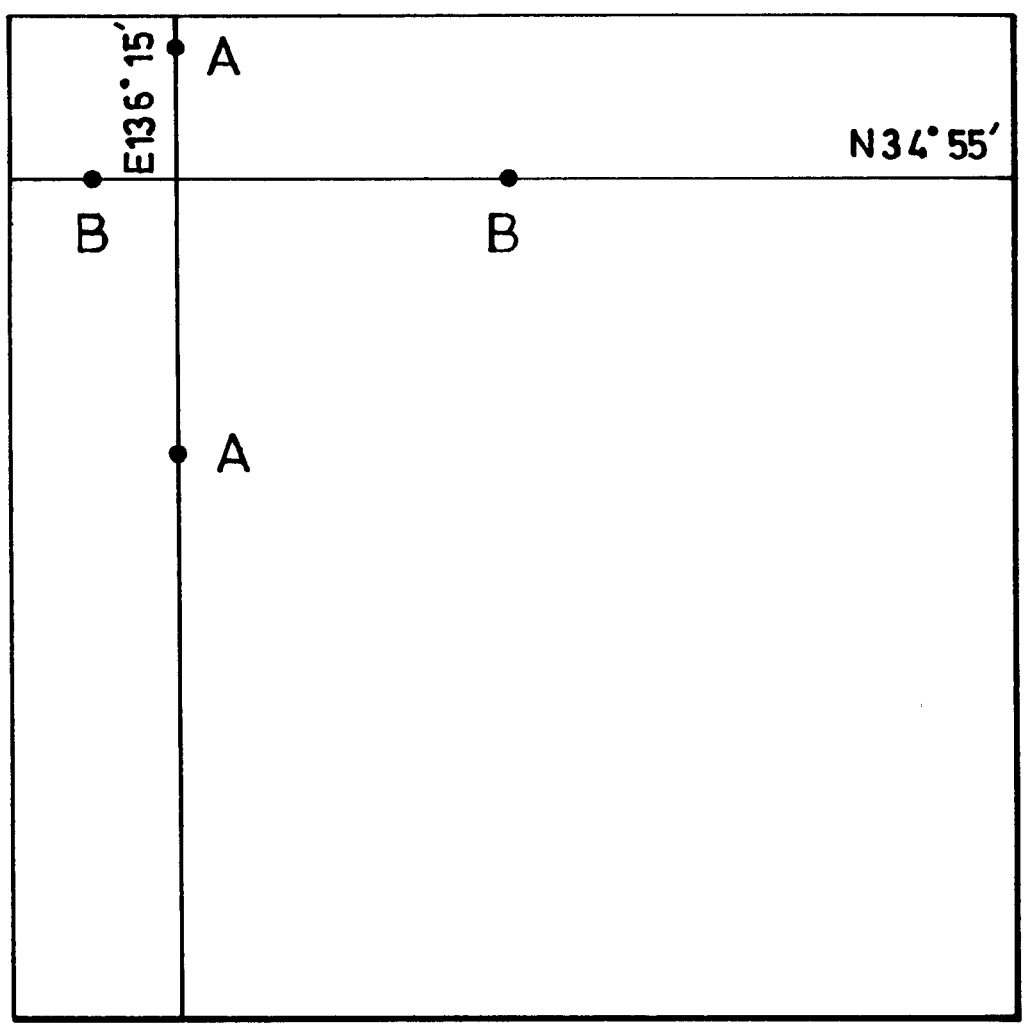
FIGS. 4 and 5 are explanatory views for the writing of the latitudinal and longitudinal lines onto the map in the embodiment of FIG. 1.
Figure 5:
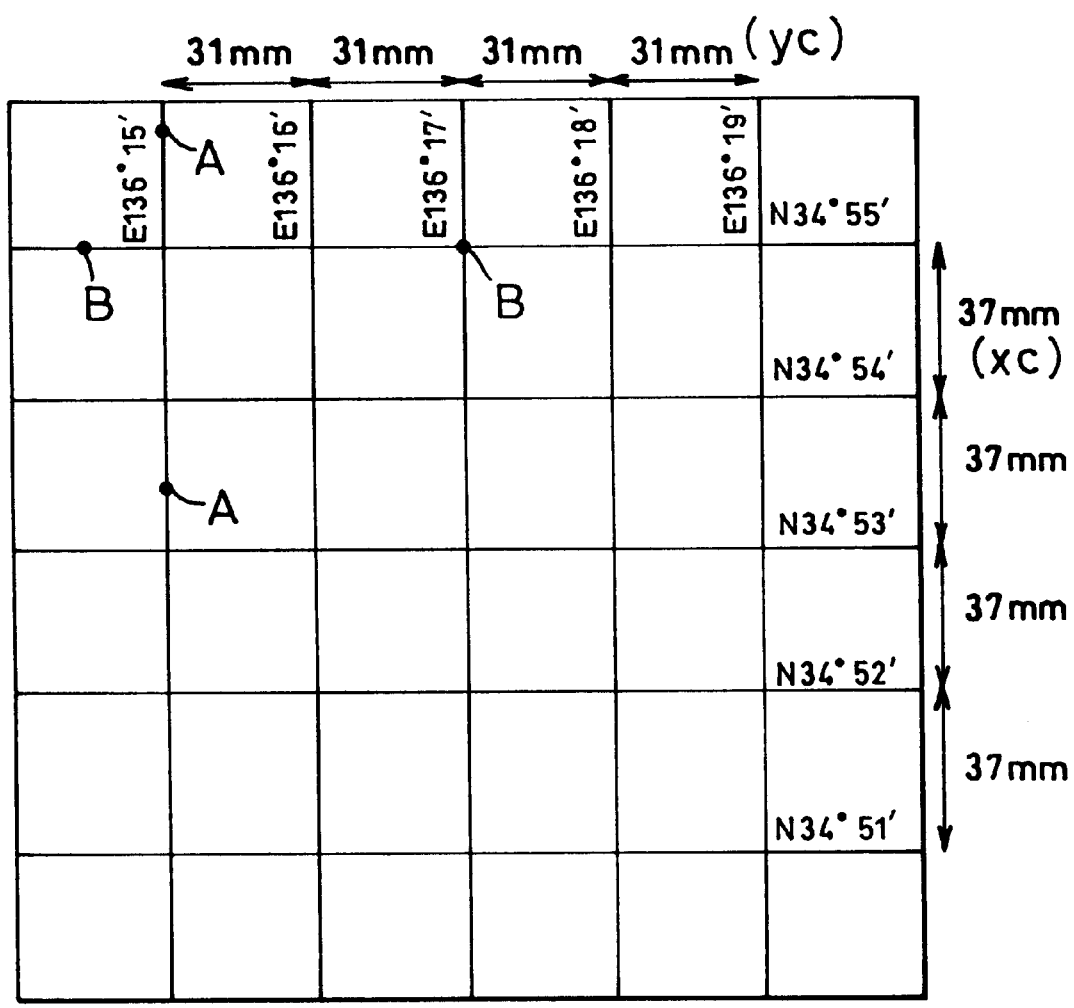

Then, the display unit 12 is removed from the map 15, the user draws on the map 15 a line passing through the transferred positions B and B as the reference latitudinal line, and another line passing through the transferred positions A and A as the reference longitudinal line, and the values xa and ya displayed on the display means 11 as to these lines X and Y are written also on the map 15 with respect to the lines X and Y drawn, as shown in particular in FIG. 4. Next, the user draws on the map 15 sequentially parallel lines with the lines X and Y drawn at the interval distances xc and yc displayed on the display means 11, and writes the latitudinal and longitudinal values denoted by the respective parallel lines in accordance with the interval values xb and yb also displayed by the display means 11, as shown in particular in FIG. 5.

In this way, it is made possible, even when a map without showing the latitudinal and longitudinal lines is employed, to write the latitudinal and longitudinal lines on the map 15 by executing the GPS survey so long as the present spot is known on this map 15, and the particular map 15 in which the latitudinal and longitudinal lines are written can be utilized for the navigation, in similar manner to the map in which these lines have been originally written as printed.

Further, while in the foregoing the description has been made such that the reference latitudinal and longitudinal lines X and Y and the present spot mark M can be displayed at any optional positions of the display means 11 of the transmissive liquid crystal board, it is also possible to render the display means 11 to be of a type in which display position of the reference latitudinal and longitudinal lines are fixed or of a type in which the display position of the present spot mark M is fixed. It should be appreciated, in this case, that one of them only is displayed, with the other used as the reference.

Figure 6:
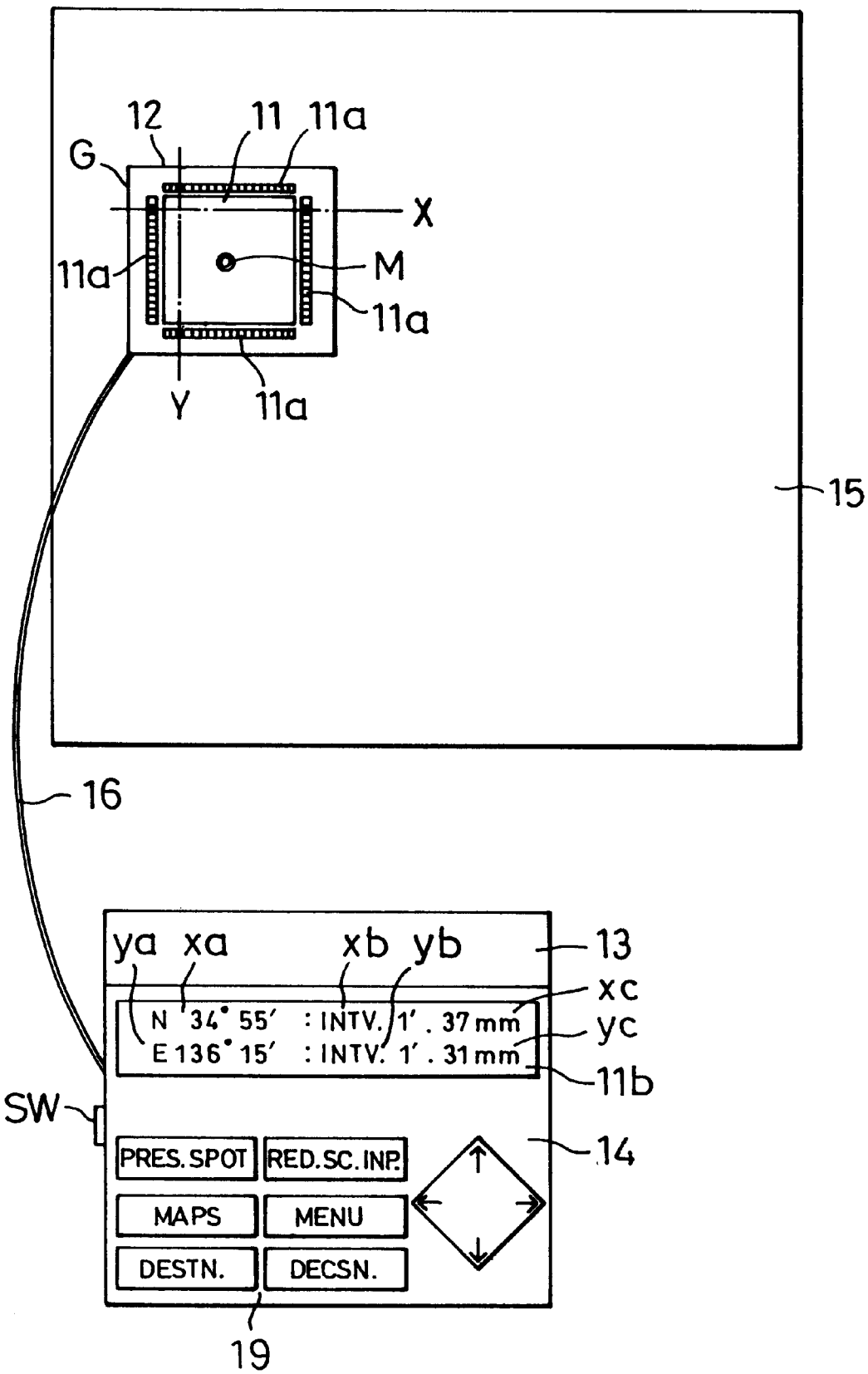
FIG. 6 is a plan view of another embodiment of the present invention.

In FIG. 6, there is shown another embodiment of the present invention, in which the display means 11 formed with a transparent plate having in the center a hole made as the present spot mark M, and guiding display sections 11a respectively comprising a light emitting diode array lying along each of four peripheral edges of the display means 11. In the main unit 14, further, a guiding display section 11b for character display is provided.

When the GPS survey is executed with this navigation apparatus, the latitudinal and longitudinal lines X and Y closest to the surveyed result are calculated at the latitudinal line intervals and longitudinal line intervals in accordance with the set reduction scale of the map, the numerical values xa and ya of these reference latitudinal and longitudinal lines X and Y as well as their actual interval values xb and yb and interval distances xc and yc on the map 15 are displayed with characters on the guiding display section 11b of the main unit 14, while the light emitting diode arrays of the guiding display sections 11a of the display unit 12 display which ones of the diodes the reference latitudinal and longitudinal lines X and Y are to pass with respect to the central present spot mark M denoting the present spot.

With this navigation apparatus, too, the use of the map having no printed latitudinal and longitudinal lines is made possible such that the GPS survey is performed at the spot known and regarded as the present spot on the map 15, the line positions displayed on the guiding display sections 11a are transferred onto the map 15, the reference latitudinal and longitudinal lines are drawn to pass through the transferred positions, the values xa and ya are written, and further parallel latitudinal and longitudinal lines and their values are written on the basis of the interval values xb and yb and the interval distances xc and yc displayed on the guiding display section 11b of the main unit 14.

Figure 7:
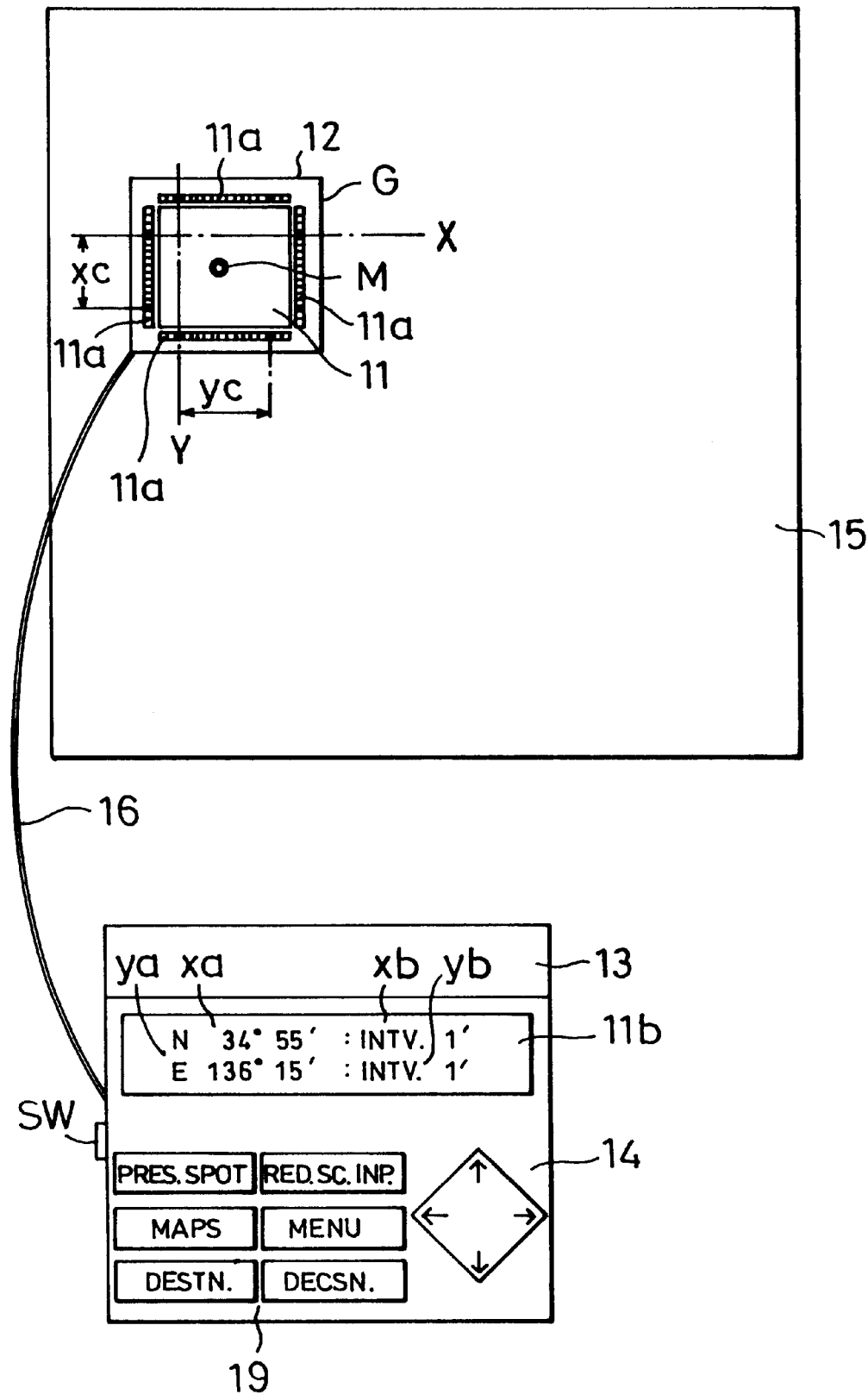
FIG. 7 is a plan view showing another embodiment of the present invention.
Figure 8:
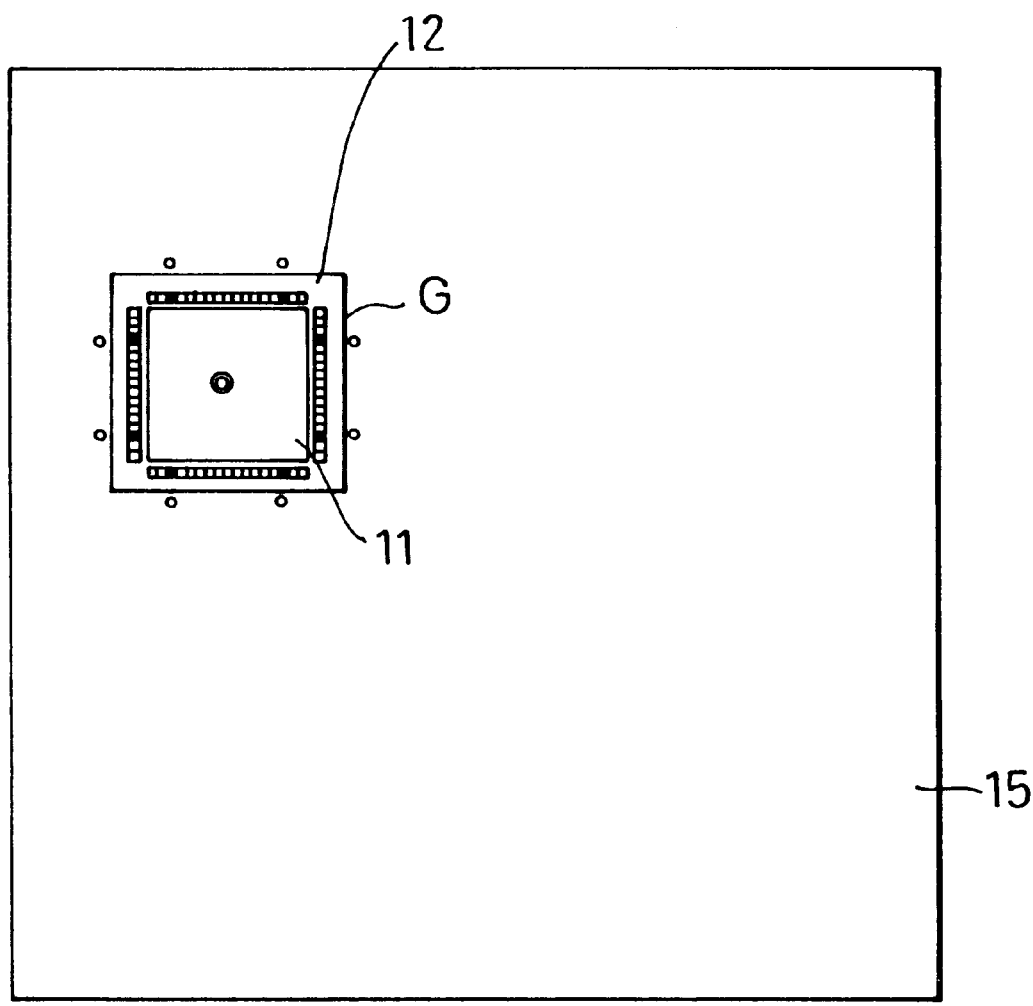
FIGS. 8 and 9 are explanatory views for the writing of the latitudinal and longitudinal line positions onto the map in the embodiment of FIG. 7.
Figure 9:
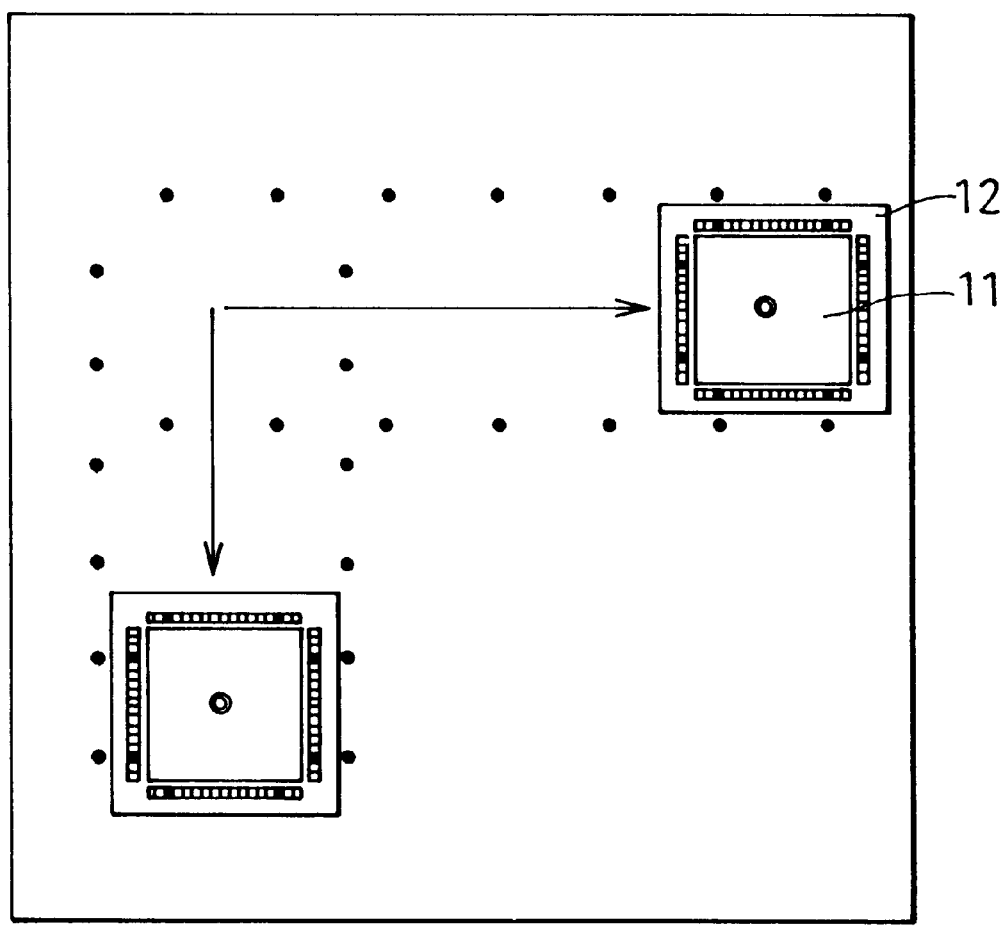
Figure 10:
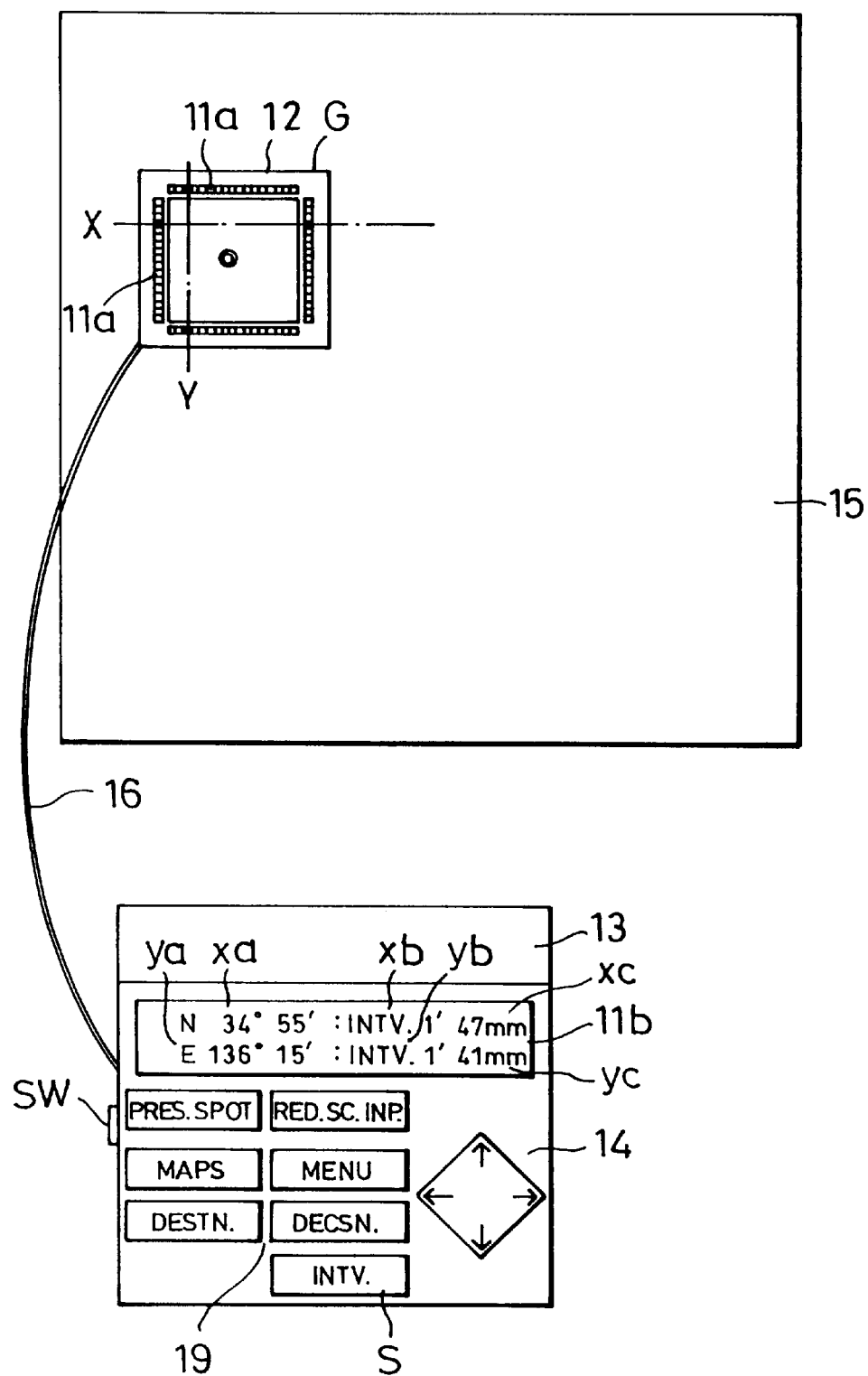
FIG. 10 shows in a plan view another embodiment of the present invention.
Figure 11:
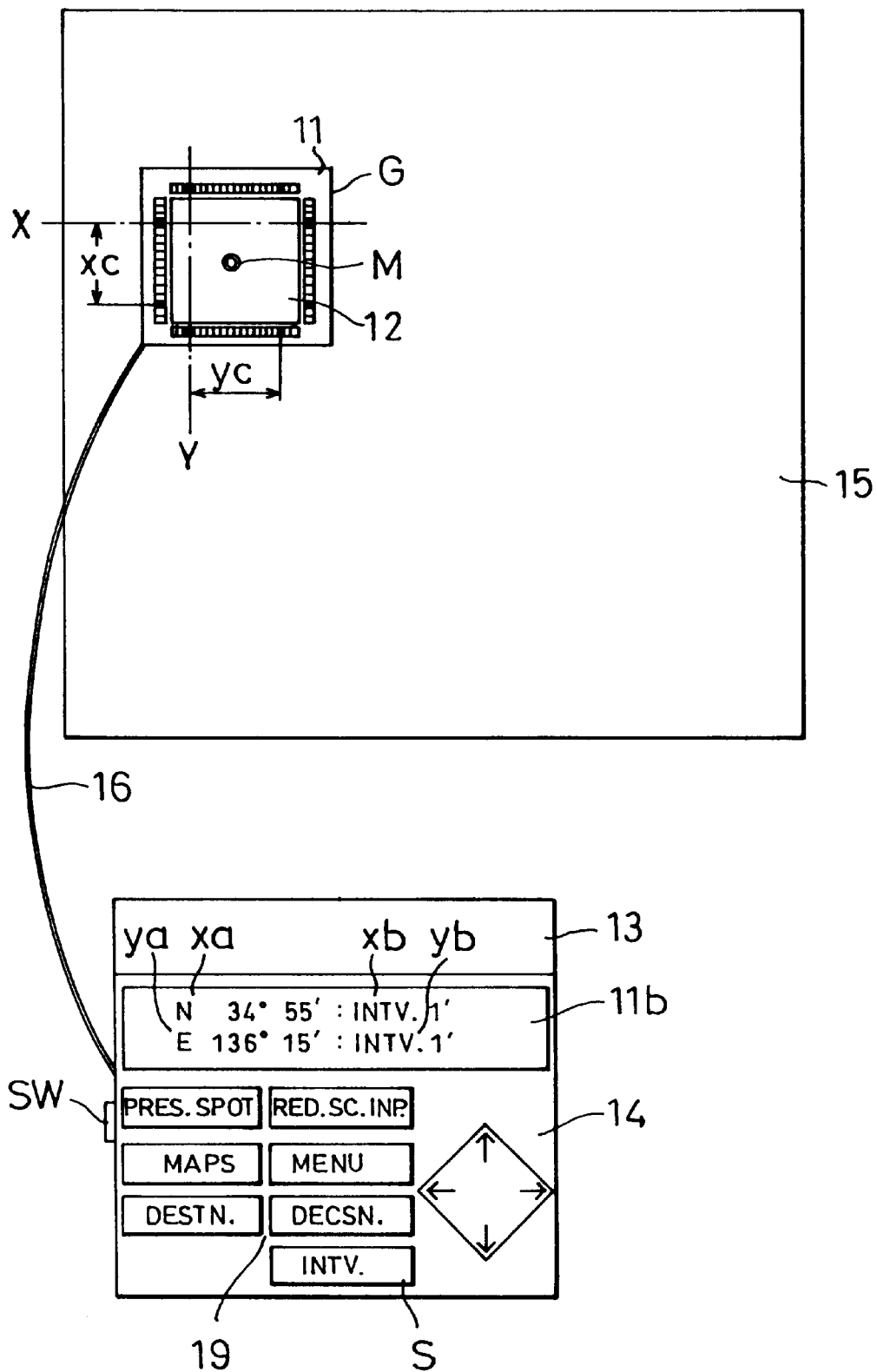
FIG. 11 shows in a plan view another embodiment of the present invention.

In another embodiment shown in FIG. 7, the guiding display sections 11a are arranged to be capable of displaying the positions where the reference latitudinal and longitudinal lines X and Y are passing and also further positions where next latitudinal and longitudinal lines at the predetermined intervals xb and yb from the reference lines X and Y are passing. In this case, the interval distances xc and yc may not be disposed on the guiding display section 11b of the main unit 14, since the interval distances xc and yc are displayed on the guiding display sections 11a of the display unit 12. In this case, as shown in FIGS. 8 and 9, the respective positions of all of the latitudinal and longitudinal lines to be written can be sequentially transferred onto the map 15, by sequentially moving the display unit 12 on the map 15. Further, this arrangement may be also applied to the apparatus shown in FIG. 1. Further, it may be possible to arrange that a display mode in which the interval distances xc and yc are displayed with characters on the guiding display section 11b of the unit 14 as shown in FIG. 10 and the other display mode in which the interval distances xc and yc are displayed on the guiding display sections 11a of the unit 12 as shown in FIG. 11 are changed over by an actuation of the operating circuit section 19.

Figure 12A:
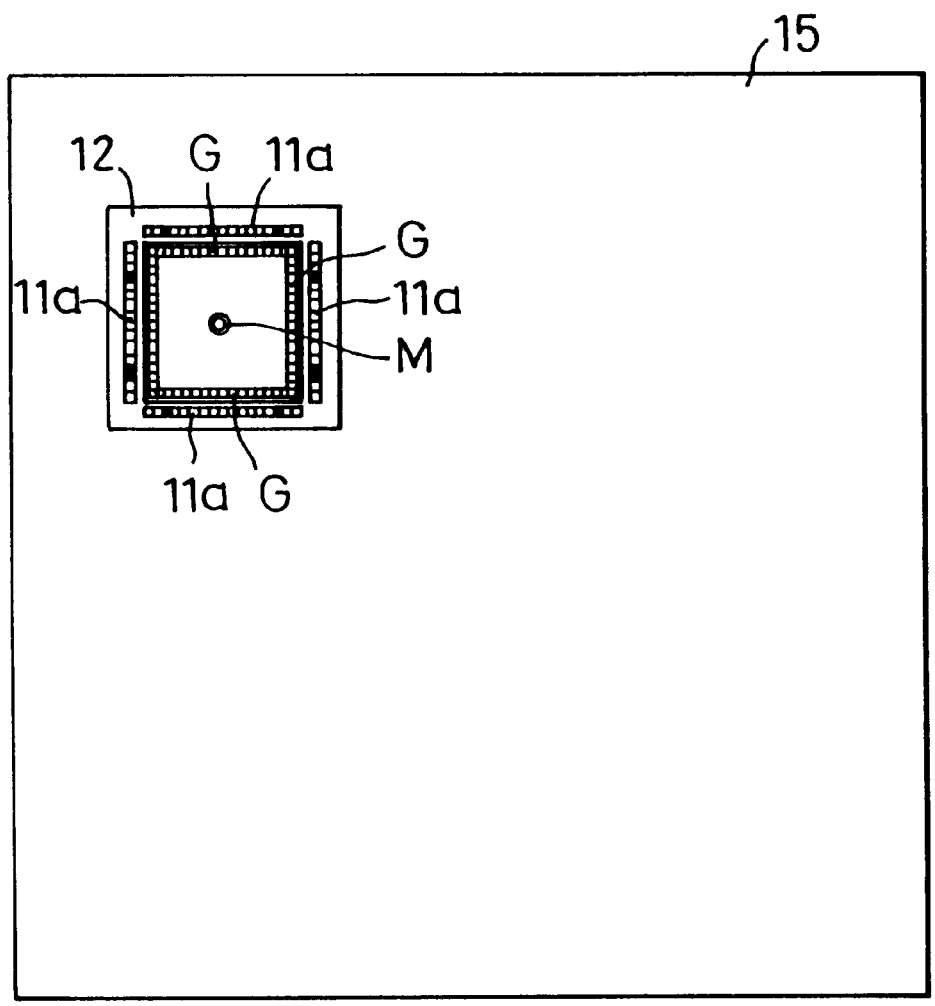
FIGS. 12a and 12b show a partial plan view of another embodiment of the present invention and a fragmentary plan view as magnified of the embodiment of FIG. 12a, respectively.
Figure 12B:
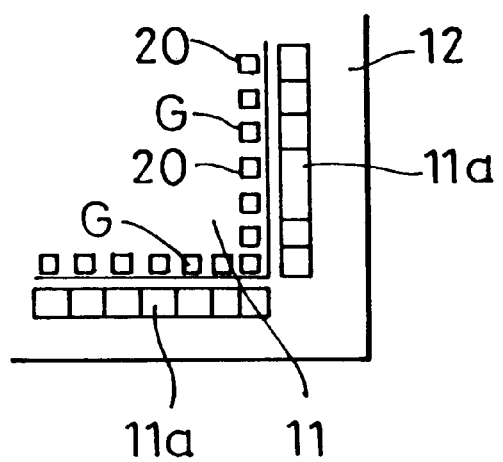
Figure 13:
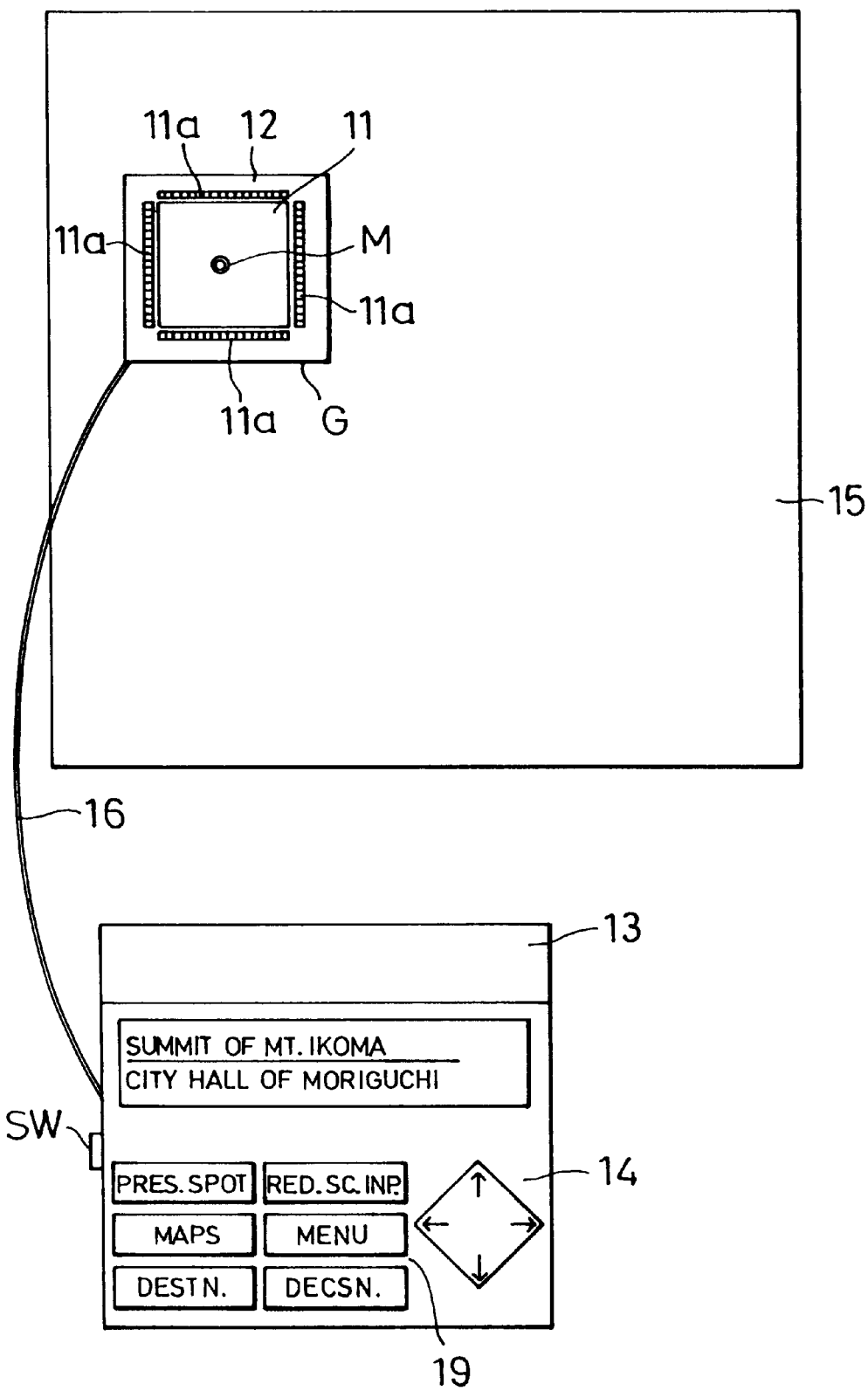
FIG. 13 shows in a plan view still another embodiment of the present invention.

As the measures for allowing the user to transfer onto the map 15 the positions coinciding with the reference latitudinal and longitudinal lines X and Y displayed on the guiding display sections 11a or the display means 11 functioning also as the guiding display sections, the respective foregoing embodiments have been referred to as employing the outer peripheral parts of the display unit 12 as a writing guide G for transferring the latitudinal and longitudinal line positions displayed, the outer peripheral parts of a casing of the display means 11 being made small in the width, with the display unit 12 including the display means 11 (as well as the guiding display sections 11a) separated from the main unit 14 to be independent thereof but connected thereto only through the cable 6 pulled out of the unit 12 at a corner. In an aspect shown in FIGS. 12a and 12b, on the other hand, the writing guide G is formed as many small holes 20 made through the display means 11 along the peripheral edges of the means, so that the user can write marks on the map 15 through the holes 20 nearest to the displayed line positions of the display means 11. In the case of the embodiment employing the guiding display sections 11a of the light emitting diode arrays as shown here, the holes 20 may be provided at the same pitch as the diodes in the arrays. This writing guide G made of the small holes 20 is applicable to the embodiment of FIG. 1, and further the display unit 12 having the writing guide G of such small holes 20 may be provided integral with the main unit 14.

Further, the foregoing navigation apparatus is not capable of allowing the user to write the latitudinal and longitudinal lines onto the map 15 unless the user surveys the position at the present spot already known on the map 15, and the writing of the latitudinal and longitudinal lines in the map 15 is also impossible in an event where the map 15 is of an area including a destination but not including the present spot of the user.

As measures for eliminating the above problem, it is optimum that the computer 18 in the main unit 14 is provided with a memory for storing the latitude and longitude values of a specific spot included in the area of the map, and the apparatus is arranged to include a calling mode in which the latitude and longitude values stored of the specific spot stored are called and displayed on the guiding display sections 11a and 11b as the positions of the latitudinal and longitudinal lines of the present spot to be brought into coincidence with those on the map 15.

That is, the respective latitude and longitude values of such spots always included in every map 15 (desirably all over the country) as summits of mountains, village, town and city halls, railway stations and the like which can be very easily specified on the map are preliminarily stored in the memory of the computer 18 together with their name or title, the user calls and selects one of such stored spots included in the map 15 being used, and the display of the reference latitudinal and longitudinal lines X and Y of the selected spot regarded here as the present spot or the display of such present spot by means of the present spot mark M can be attained in similar manner to the case of the foregoing GPS survey.

With the above arrangement, it is enabled to write the latitude and longitude lines in the map even when the present spot is not known in the map or is not included in the map, by pointing the specific spot on the map 15 with the present spot mark M of the display unit 12 with the N direction of the unit disposed in conformity to the N direction of the map, and having the reference latitudinal and longitudinal lines X and Y of the specific spot as the present spot displayed or having the present spot displayed by means of the present spot mark M. This arrangement can be applied also to the embodiment shown in FIG. 1.

According to the present invention, therefore, it is made possible to draw the latitudinal and longitudinal lines with respect to the present spot which has been already known on the map, by transferring onto the map the positions of the latitudinal and longitudinal lines displayed on the guiding display sections, in the state where the present spot mark M is placed on the present spot on the map. It should be readily appreciated that, so long as the display means is provided for the display of the interval values of the latitudinal and longitudinal lines on the guiding display sections as well as the interval values of the latitudinal and longitudinal lines on the map, it is possible to write the latitudinal and longitudinal lines into all over the map being used as based on the latitudinal and longitudinal lines written in the map in accordance with the result of the single survey as well as the interval values of the latitudinal and longitudinal lines on the map as displayed on the guiding display sections.

What is claimed is:

1. A portable navigation apparatus for writing reference latitude and longitude lines on a generally available map indicating a reduction scale and north direction thereof, the apparatus comprising:

means for performing a survey to determine the latitude and longitude of a present spot where the portable navigation apparatus is disposed;

a transmissive display having a present-spot mark, the display being placeable on the map for displaying positions of a reference latitude line and a reference longitude line with respect to the present-spot mark on the basis of the survey in accordance with the reduction scale of the map;

guiding display means for displaying at least numerical values of the reference latitude and longitude lines displayed;

means for controlling the positions with respect to the present-spot mark of the latitude and longitude lines to be displayed on the transmissive display means;

means for calculating values of respective intervals of the latitude and longitude lines on the map in accordance with the surveyed latitude and longitude of the present spot and the reduction scale of the map; and writing guide means disposed adjacent to the transmissive display for guiding transfer by the user onto the map of the positions of the reference latitude and longitude lines displayed by the transmissive display means placed on the map, with the displayed position of the reference longitude line and the present-spot mark brought into coincidence respectively with the north direction and present spot on the map.

2. The apparatus according to claim 1 wherein the transmissive display means includes guiding display means for displaying the values of the reference latitude and longitude lines together with the positions of the latitude and longitude lines and the values of the intervals of the latitude and longitude lines on the map.

3. The apparatus according to claim 1 wherein the guiding display means displays the values of the reference latitude and longitude lines and the values of the intervals of the respective latitude lines and longitude lines.

4. The apparatus according to claim 1 wherein the transmissive display means comprises a transmissive display section including the present-spot mark and a casing surrounding the display section and the writing guide means comprises outer peripheral edges of the casing.

5. The apparatus according to claim 1 wherein the transmissive display means comprises a transmissive display section including the present-spot mark and a casing surrounding the display section and the writing guide means comprises a plurality of holes provided in peripheral edges of the display section along inner peripheral edges of the casing.

6. The apparatus according to claim 1 wherein the display means displays the positions, with respect to the present-spot mark, of pairs of adjacent latitude lines and of adjacent longitude lines according to the intervals of the latitude and longitude lines calculated by the control means.

7. The apparatus according to claim 1 wherein the control means comprises a memory for preliminarily storing latitude values and longitude values of a plurality of specific spots of which the latitude and longitude values are known, and means for calling out of the memory the latitude and longitude values of at least one of the specific spots which is included on the map utilized and causing the positions of the reference latitude and longitude lines of the specific spot on the map when this specific spot is regarded as the present spot to be displayed by the transmissive display means.

8. A process for writing latitude and longitude lines onto a generally available map indicating a reduction scale and north direction thereof, the process comprising the steps of:

preparing means for surveying the latitude and longitude of a present spot;

surveying, by the surveying means, the latitude and longitude at a spot for which the position on the map utilized is known;

obtaining values of intervals between the respective latitude and longitude lines on the map in accordance with the reduction scale of the map;

preparing display means for displaying positions of reference latitude and longitude lines with respect to a present-spot mark of the display means and indicative of the present spot on the map on the basis of the values of intervals obtained;

placing on the map the display means which displaying the positions with the present-spot mark brought into coincidence with the present spot on the map and with the position of the reference latitude line brought into coincidence with the north direction of the map;

transferring onto the map the positions of the reference latitude and longitude lines in accordance with the displayed positions of these reference latitude and longitude lines with respect to the present spot mark; and writing the reference latitude and longitude lines onto the map according to the transferred positions.

9. The process according to claim 8, further comprising the step of sequentially writing onto the map adjacent ones of the latitude and longitude lines with respect to the written reference latitude and longitude lines in accordance with the previously obtained values of intervals of the latitude and longitude lines.

10. A process for writing latitude and longitude lines onto a generally available map which indicates a reduction scale and north direction thereof, the process comprising the steps of:

preparing means for storing preliminary values of latitudes and longitudes of a plurality of specific spots for which the latitude and longitude values are known;

preparing means having a present-spot mark for displaying positions of reference latitude and longitude lines with respect to the present spot mark on the basis of respective values of intervals of latitude and longitude lines obtained in accordance with the reduction scale of the map:

calling out of the storing means the latitude and longitude values of at least one of the specific spots which is contained on the map utilized among the specific spots stored in the storing means;

causing the positions of the reference latitude and longitude lines displayed by the display means with respect to the present-spot mark when the one specific spot is regarded as the present spot on the basis of the called latitude and longitude values of the specific spot;

transferring onto the map the positions of the reference latitude and longitude lines in accordance with these positions displayed by the display means when the display means is placed on the map with the present-spot mark and reference longitude line position of the display means brought into coincidence respectively with the specific spot on the map and with the north direction of the map;

writing on the map the reference latitude and longitude line in accordance with their positions transferred; and sequentially writing on the map adjacent ones of the latitude and longitude lines with respect to the reference latitude and longitude lines on the basis of the obtained values of intervals of the latitude and longitude lines.

* * * * *